United States Patent
Edwards et al.

(10) Patent No.: US 10,876,417 B2
(45) Date of Patent: Dec. 29, 2020

(54) TUNED AIRFOIL ASSEMBLY

(71) Applicant: UNITED TECHNOLOGIES CORPORATION, Farmington, CT (US)

(72) Inventors: William R. Edwards, Stratham, NH (US); Charles H. Warner, South Portland, ME (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 233 days.

(21) Appl. No.: 15/680,081

(22) Filed: Aug. 17, 2017

(65) Prior Publication Data

US 2019/0055850 A1 Feb. 21, 2019

(51) Int. Cl.
| | |
|---|---|
| F01D 9/04 | (2006.01) |
| F01D 5/26 | (2006.01) |
| F01D 25/06 | (2006.01) |
| F01D 11/00 | (2006.01) |
| F01D 25/24 | (2006.01) |

(52) U.S. Cl.
CPC ............ *F01D 9/042* (2013.01); *F01D 5/26* (2013.01); *F01D 9/041* (2013.01); *F01D 11/005* (2013.01); *F01D 25/06* (2013.01); *F01D 25/246* (2013.01); *F05D 2220/32* (2013.01); *F05D 2230/50* (2013.01); *F05D 2260/96* (2013.01); *F05D 2260/961* (2013.01)

(58) Field of Classification Search
CPC ........ F01D 9/042; F01D 9/041; F01D 11/005; F01D 25/246; F01D 5/26; F01D 25/06; F05D 2220/32; F05D 2230/50; F05D 2260/96; F05D 2260/961
USPC ....................................................... 415/209.3
See application file for complete search history.

(56) References Cited

U.S. PATENT DOCUMENTS

| 2,654,566 A | 10/1953 | Boyd et al. | |
|---|---|---|---|
| 2,945,290 A * | 7/1960 | Walsh | F01D 9/042 |
| | | | 29/889.22 |

(Continued)

FOREIGN PATENT DOCUMENTS

| EP | 1529926 | 5/2005 |
|---|---|---|
| EP | 2204536 | 7/2010 |
| EP | 2599963 | 6/2013 |

OTHER PUBLICATIONS

William R. Edwards, U.S. Appl. No. 15/373,774, filed Dec. 9, 2016 and entitled Stator With Support Structure Feature for Tuned Airfoil.

(Continued)

*Primary Examiner* — Hung Q Nguyen
*Assistant Examiner* — Susan E Scharpf
(74) *Attorney, Agent, or Firm* — Snell & Wilmer L.L.P.

(57) ABSTRACT

An airfoil assembly may include a shroud and an airfoil. The shroud may include a first attachment arm, a second attachment arm, and a shroud rail extending from a first surface of the shroud. A first channel may be defined between the first attachment arm, the first surface, and the shroud rail and a second channel may be defined between the second attachment arm, the first surface, and the shroud rail. The airfoil may extend from a second surface of the shroud opposite the first surface. In various embodiments, a height of the shroud rail, as measured from the first surface of the shroud, is non-uniform.

12 Claims, 7 Drawing Sheets

(56) References Cited

U.S. PATENT DOCUMENTS

| | | | | |
|---|---|---|---|---|
| 3,326,523 | A * | 6/1967 | Bobo | F01D 9/042 415/209.3 |
| 4,285,633 | A * | 8/1981 | Jones | F01D 11/001 415/191 |
| 4,511,306 | A * | 4/1985 | Hultgren | F01D 9/042 415/136 |
| 4,907,944 | A * | 3/1990 | Kroger | F01D 5/3038 415/190 |
| 5,022,818 | A * | 6/1991 | Scalzo | F01D 9/042 415/189 |
| 5,203,676 | A | 4/1993 | Ferleger et al. | |
| 5,299,910 | A * | 4/1994 | Gilchrist | F01D 9/042 415/189 |
| 5,429,479 | A * | 7/1995 | Cordier | F01D 5/26 415/209.3 |
| 5,524,341 | A | 6/1996 | Ferleger et al. | |
| 5,584,654 | A * | 12/1996 | Schaefer | F01D 9/042 415/190 |
| 6,379,112 | B1 | 4/2002 | Montgomery | |
| 6,398,489 | B1 * | 6/2002 | Burdgick | F01D 5/141 415/115 |
| 6,471,482 | B2 | 10/2002 | Montgomery et al. | |
| 7,024,744 | B2 | 4/2006 | Martin et al. | |
| 7,252,481 | B2 | 8/2007 | Stone | |
| 7,618,234 | B2 * | 11/2009 | Brackett | F01D 9/04 29/889.22 |
| 8,834,098 | B2 | 9/2014 | Glaspey | |
| 9,366,149 | B2 * | 6/2016 | Blaney | F01D 9/04 |
| 9,410,436 | B2 | 8/2016 | Kulathu et al. | |
| 2003/0068225 | A1 | 4/2003 | Housley et al. | |
| 2010/0150710 | A1 | 6/2010 | Khanin et al. | |
| 2010/0166550 | A1 | 7/2010 | Devangada et al. | |
| 2011/0243725 | A1 | 10/2011 | Jones et al. | |
| 2012/0317772 | A1 | 12/2012 | Herbold et al. | |
| 2013/0142640 | A1 * | 6/2013 | Houston | F01D 9/041 415/208.2 |
| 2018/0010470 | A1 * | 1/2018 | Baumann | F01D 9/041 |
| 2018/0010472 | A1 * | 1/2018 | Baumann | F01D 9/041 |

OTHER PUBLICATIONS

European Patent Office, European Search Report dated May 8, 2018 in Application No. 17206554.2.

European Patent Office, European Search Report dated Jan. 22, 2019 in Application No. 18188987.4.

* cited by examiner

TUNED AIRFOIL ASSEMBLY

FIELD

The present disclosure relates to airfoils, and more specifically, to shaping a shroud of an airfoil assembly to tune an aeromechanical response of the airfoil assembly.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Airfoils, such as rotor blades and stator vanes, are often utilized in various sections of gas turbine engines to direct, condition, and affect the flow of fluids (e.g., air and/or combustion gases) through the gas turbine engine. Airfoil geometry is often determined and selected in light of competing design factors. For example, an airfoil may be designed to have a geometry optimized for aerodynamic performance and operability. However, airfoil geometry is also directly related to airfoil frequencies (e.g., vibrational or aeromechanical responses). That is, conventional airfoils are often designed to sacrifice a degree of aerodynamic performance in exchange for improved control over airfoil frequency modes (e.g., limiting airfoil frequency modes), thereby controlling and/or limiting the extend of structural distress the airfoil experiences during operation.

SUMMARY

In various embodiments, the present disclosure provides an airfoil assembly that includes a shroud having a first attachment arm, a second attachment arm, and a shroud rail extending from a first surface of the shroud. A first channel may be defined between the first attachment arm, the first surface, and the shroud rail, and a second channel may be defined between the second attachment arm, the first surface, and the shroud rail. The airfoil assembly may further include an airfoil extending from a second surface of the shroud opposite the first surface.

In various embodiments, a height of the shroud rail, as measured from the first surface of the shroud, is non-uniform. In various embodiments, the height of the shroud rail varies in a first direction from the first attachment arm to the second attachment arm, wherein the first direction is parallel to the first surface. In various embodiments, the height of shroud rail tapers in the first direction. In various embodiments, the height of the shroud rail varies in a second direction normal to an axis extending between the first attachment arm and the second attachment arm, wherein the second direction is parallel to the first surface. In various embodiments, the height of shroud rail tapers in the second direction. In various embodiments, the height of the shroud rail varies in a first direction from the first attachment arm to the second attachment arm and the height of the shroud varies in a second direction normal to the first direction and parallel to the first surface. According to various embodiments, a distance between the first surface and the second surface is substantially uniform.

Also disclosed herein, according to various embodiments, is a gas turbine engine that includes a case structure and an airfoil assembly. The airfoil assembly may include a shroud and an airfoil. The airfoil assembly may be mounted to the case structure via a first attachment arm and a second attachment arm of the shroud of the airfoil assembly. A shroud rail of the shroud partially extends between the first attachment arm and the second attachment arm, according to various embodiments.

In various embodiments, the airfoil assembly is a singlet stator vane. In various embodiments, the shroud rail extends from a first surface of the shroud, a first channel is defined between the first attachment arm, the first surface, and the shroud rail, a second channel is defined between the second attachment arm, the first surface, and the shroud rail, and the airfoil extends from a second surface of the shroud opposite the first surface.

In various embodiments, a height of the shroud rail, as measured from the first surface of the shroud, is non-uniform. In various embodiments, the height of the shroud rail varies in a substantially axial direction from the first attachment arm to the second attachment arm, wherein the substantially axial direction is parallel to the first surface. In various embodiments, the height of the shroud rail varies in a substantially circumferential direction, wherein the second direction is parallel to the first surface.

According to various embodiments, the shroud rail includes a forward wall and an aft wall. The gas turbine engine may further include a sealing panel extending over the shroud rail from a first edge coupled to the forward wall and a second edge coupled to the aft wall. The sealing panel may inhibit radial fluid leakage. For example, in various embodiments, the airfoil assembly is a singlet stator vane and the sealing panel extends over and is coupled to respective shroud rails of one or more circumferentially adjacent singlet stator vanes. In various embodiments, the forward wall is concave and the aft wall is concave to facilitate coupling and retention of the sealing panel to the shroud rail.

Also disclosed herein, according to various embodiments, is a manufacturing method. The manufacturing method includes forming a shroud rail extending from a first surface of a shroud of an airfoil assembly, forming an airfoil extending from a second surface of the shroud opposite the first surface, and shaping the shroud rail to tune an aeromechanical response of the airfoil assembly, according to various embodiments. Shaping the shroud rail may include making a height of the shroud rail, as measured from the first surface of the shroud, non-uniform. The method may also include coupling a sealing panel to the shroud rail of the airfoil assembly such that the sealing panel extends over and is coupled to respective shroud rails of one or more circumferentially adjacent singlet stator vanes.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
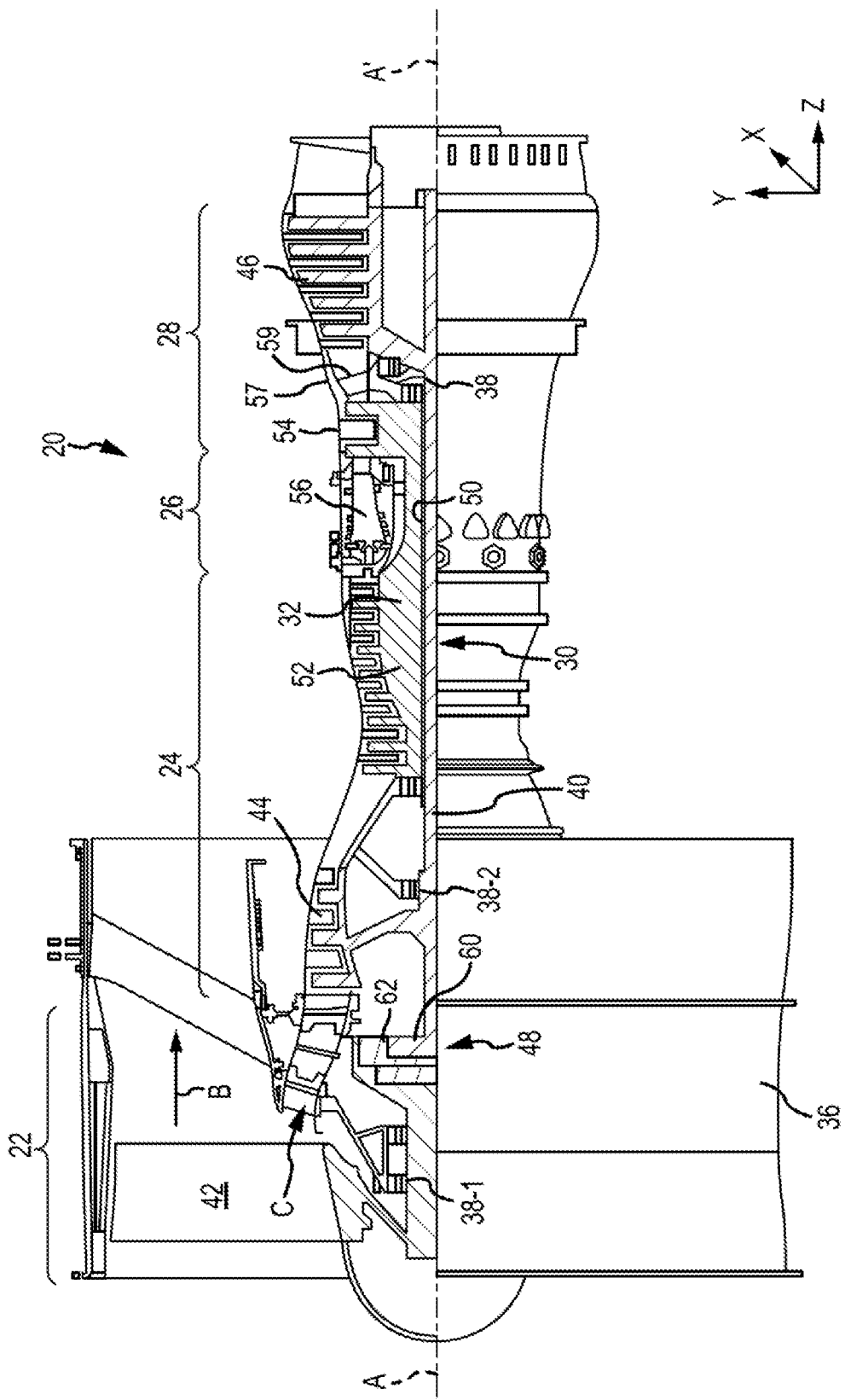
FIG. 1 is a cross-sectional view of an exemplary gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine. A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor. The term "axial," as used herein, refers to a direction along or parallel to the engine central longitudinal axis.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction (axial direction) on the provided xyz axis. The y direction on the provided xyz axis refers to radial directions and the x direction on the provided xyz axis refers to the circumferential direction. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 via structure 59 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

As mentioned above, airfoils are generally used to direct, condition, and otherwise affect the flow of air and other fluids. Aerodynamic performance and controlled airfoil frequency modes (i.e., aeromechanical responses) are two competing design considerations when manufacturing an airfoil. According to various embodiments, and with reference to FIG. 1, the present disclosure provides an airfoil assembly 100 that allows for control of airfoil frequency modes to be achieved via shaping and configuring a shroud 110 of the airfoil assembly 100, thereby allowing aerodynamic performance to be the driving design consideration in shaping the geometry of the airfoil 105. Said differently, instead of tuning the geometry and shape the airfoil 105 to meet frequency mode considerations, the shape and geometry of the shroud 110 is customized to tune the frequency mode of the airfoil assembly 100 while the shape and geometry of the airfoil 105 is customized to optimize aerodynamic performance.

In various embodiments, and with continued reference to FIG. 1, the airfoil assembly 100 includes the shroud 110 and the airfoil 105 (i.e., the airfoil body). The shroud 110 includes a first attachment arm 111, a second attachment arm 112, and a shroud rail 113 extending from a first surface 114 of the shroud 110, according to various embodiments. The airfoil 105 extends from a second surface 115 of the shroud 110 opposite the first surface 114. The airfoil 105 may include a pressure side, a suction side, a leading edge 106, a trailing edge 107, and a tip 108. The airfoil may be a stator vane or a rotor blade, as described in greater detail below. It is noted that while numerous details are included herein pertaining to airfoils for gas turbine engines, the airfoil assembly 100 disclosed herein may be utilized in a variety of industries/applications and may have a variety of sizes, shapes, and geometries. Accordingly, the airfoil assembly 100 of the present disclosure is not limited to gas turbine engines and is not limited to the specific geometry, size, and shape shown in the figures.

Figure 2:
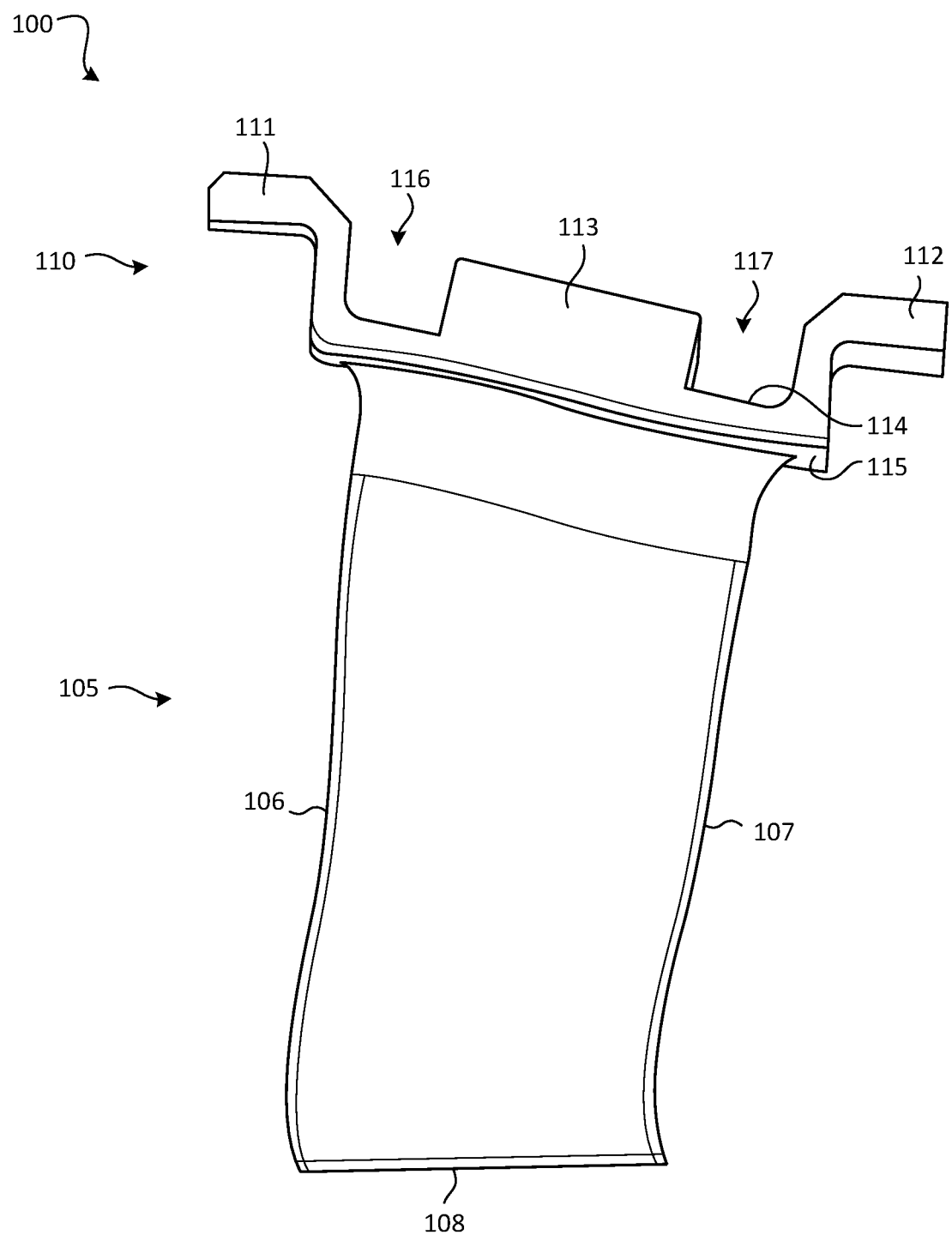
FIG. 2 is a perspective view of an airfoil assembly, in accordance with various embodiments.
Figure 3:
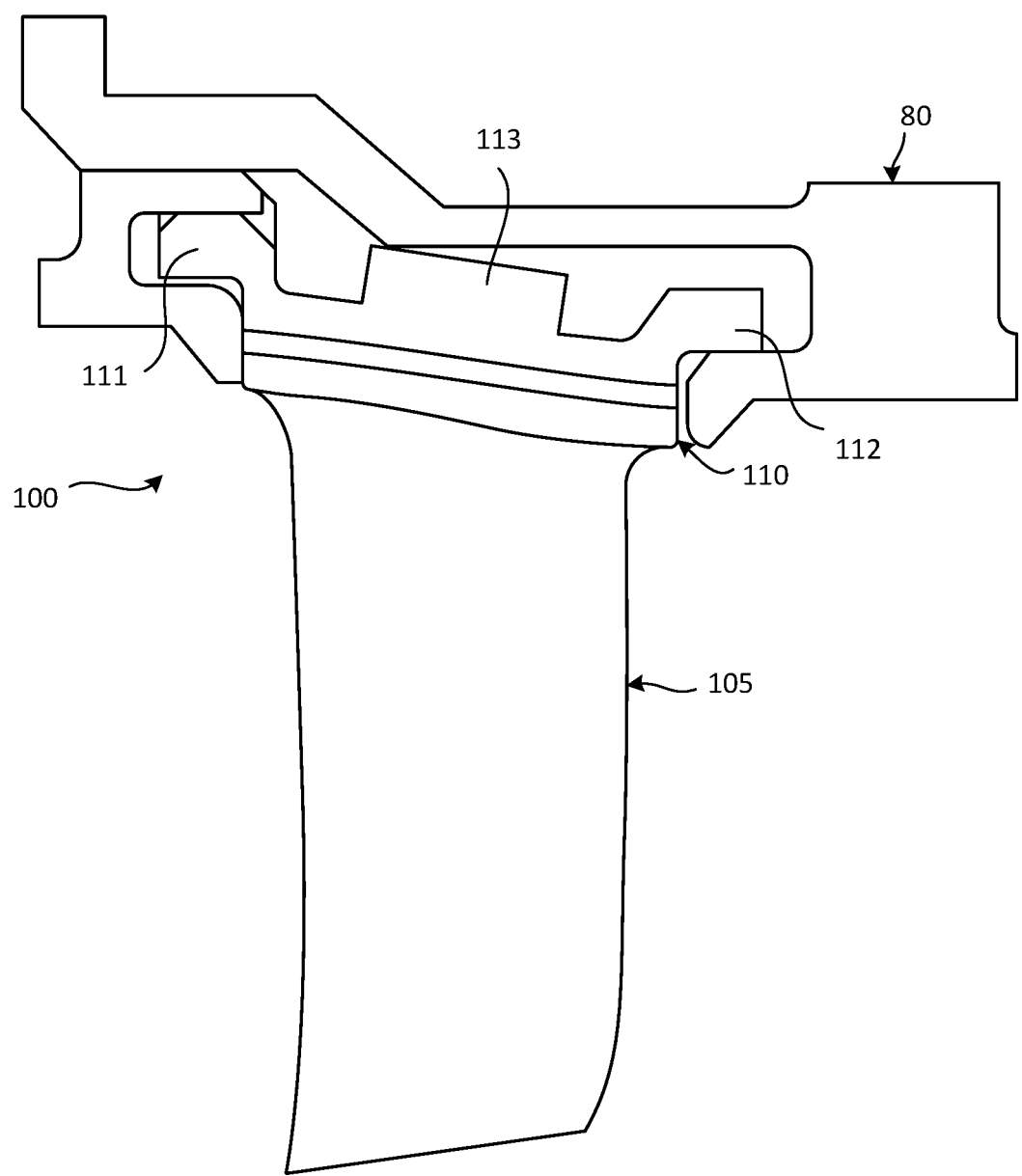
FIG. 3 is a view of an airfoil assembly mounted to a case structure of a gas turbine engine, in accordance with various embodiments.

In various embodiments, and with reference to FIGS. 2 and 3, the shroud rail 113 extending from the first surface 114 of the shroud 110 is designed and shaped to "tune" the airfoil assembly. As used herein, the term "tune" refers to designing the geometry of the shroud rail 113 so as to impart a desired frequency mode to the airfoil assembly 100, thereby controlling the aeromechanical response of the airfoil assembly 100 to limit the structural stress experienced by the airfoil assembly 100 and/or the surrounding and adjacent components. In various embodiments, for example, the airfoil assembly 100 may be mounted to a case structure 80 of the gas turbine engine 20. That is, the first attachment arm 111 and the second attachment arm 112, which may extend from and be disposed on respective forward and aft sides of the shroud 110, can be coupled to the case structure 80. For example, the airfoil assembly 100 may be a singlet stator vane coupled to a compressor case of the gas turbine engine.

In various embodiments, the shroud rail 113 partially extends between the first attachment arm 111 and the second attachment arm 112. In various embodiments, a first channel 116 is defined between the first attachment arm 111, the first surface 114 of the shroud 110, and the shroud rail 113 while a second channel 117 is defined between the second attachment arm 112, the first surface 114 of the shroud 110, and the shroud rail 113. The first and second channels 116, 117 may be grooves or troughs formed on the forward and aft sides, respectively, of the shroud rail 113. In various embodiments, the channels 116, 117 are not necessarily uniform, fully developed channels. That is, the channels 116, 117 may be indentations or pockets formed in the shroud 110. In various embodiments, the first and second channels 116, 117 extend in a substantially circumferential direction. In various embodiments, the channels 116, 117 do not extend completely circumferentially through the shroud 110 and thus may only extend partially circumferentially through the body of the shroud 110. As used herein with reference to directions and axes, the term "substantially" means generally aligned with or generally oriented in a respective one of the radial (y direction), circumferential (x direction), or axial (z direction) directions defined above with reference to FIG. 1. As mentioned above, the shroud rail 113 is the portion of the airfoil assembly 100 that is designed and/or modified to have a desired mitigation effect on the frequency mode and aeromechanical response of the airfoil assembly 100.

Figure 4:
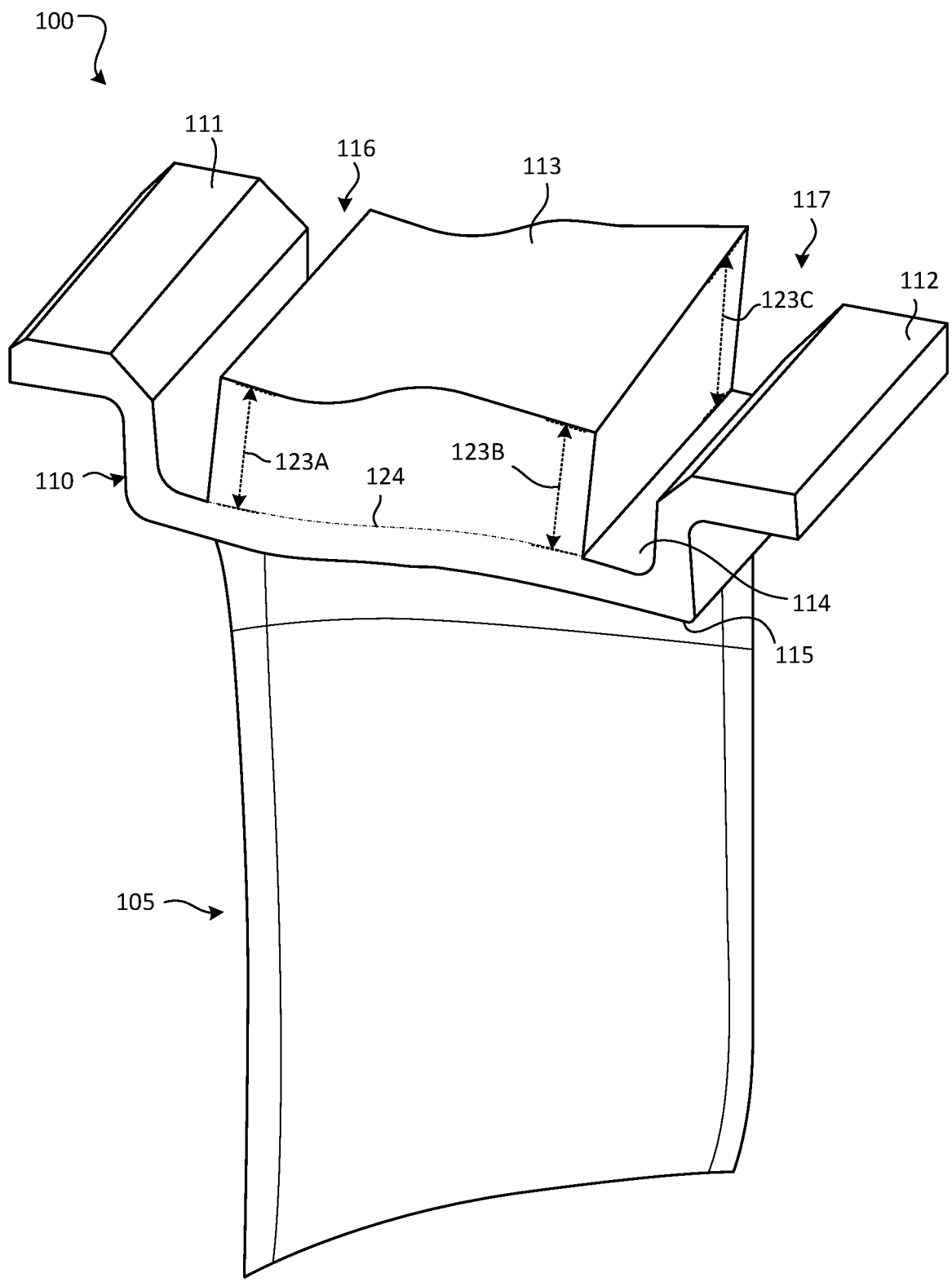
FIG. 4 is a perspective view of an airfoil assembly having a shroud rail with a non-uniform height, in accordance with various embodiments.

In various embodiments, and with reference to FIG. 4, a height of the shroud rail 113 is measured from the first surface 114 of the shroud 110. That is, the height of the shroud rail 113 is defined as the distance from the first surface 114 of the shroud 110, or from at least a projected plane 124 of the first surface 114 extending through the body of the shroud rail 113, in a radial direction to the radially outward edge of the shroud rail 113. In various embodiments, a distance between the first surface 114 (or projected plane 124) and the second surface 115 is substantially uniform. As used in this context only, the term "substantially uniform" means that the distance between the first surface 114 and the second surface 115 varies less than 10%. In various embodiments, and with continued reference to FIG. 4, the shroud rail 113 has a non-uniform geometry in that the height of the shroud rail 113 varies (i.e., is not constant or is non-uniform). This non-uniformity, according to various embodiments, refers only to the height variation of the shroud rail 113, and thus the footprint (i.e., the perimeter dimension and/or geometry) of the shroud rail 113 may remain constant but the height of the shroud rail 113 may vary. For example, height 123A may be less than height 123B, which may be less than height 123C. Accordingly, shroud rail 113 may have an undulating geometry. Generally, the shape and overall geometry of the shroud rail 113 may be selected based on tuning parameters for the airfoil assembly 100.

Figure 5A:
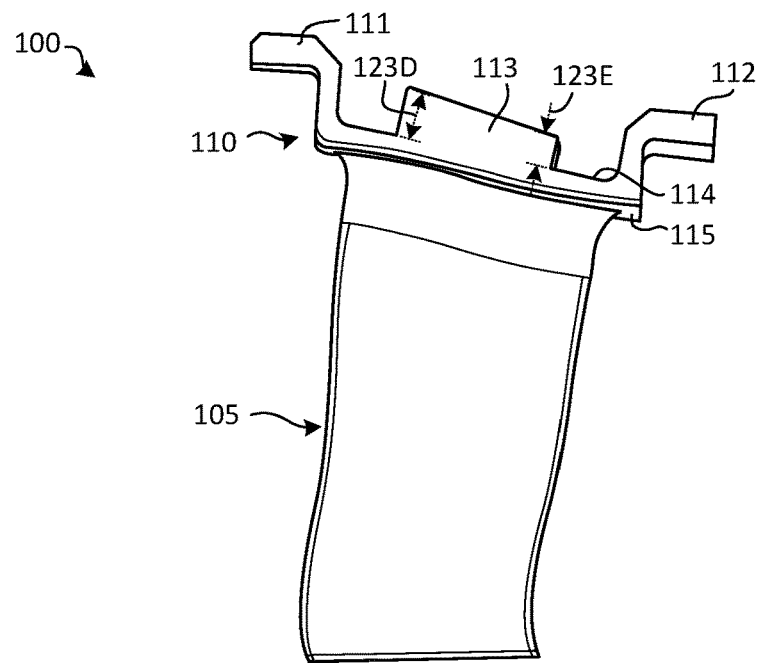
FIG. 5A is a perspective view of an airfoil assembly having an axially tapering shroud rail.
Figure 5B:
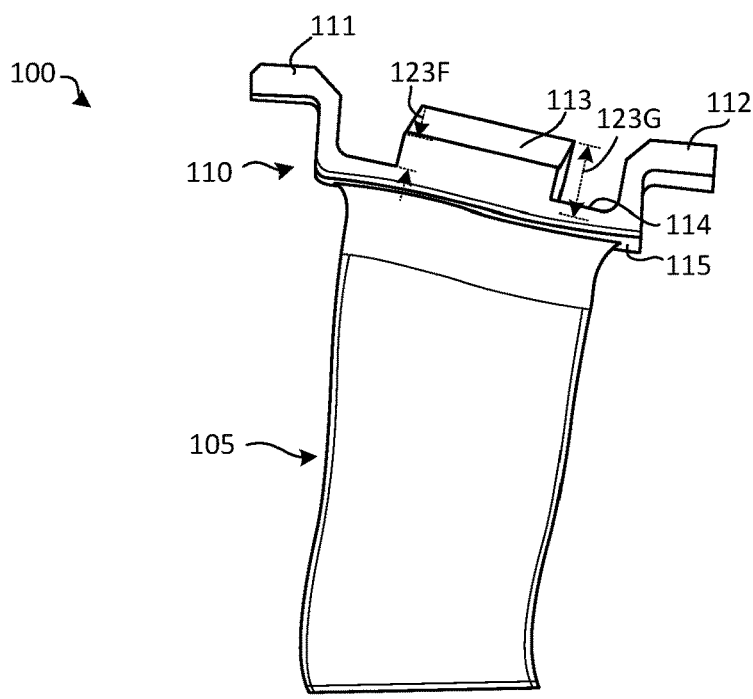
FIG. 5B is a perspective view of an airfoil assembly having a circumferentially tapering shroud rail, in accordance with various embodiments.

In various embodiments, and with reference to FIG. 5A, the height of the shroud rail 113 varies in a first direction from the first attachment arm 111 to the second attachment arm 112 (an axial direction). Said differently, the height of the shroud rail 113 may taper or converge in the axial direction, as shown in FIG. 5A with height 123D being greater than height 123E. In various embodiments, and with reference to FIG. 5B, the height of the shroud rail 113 varies in a second direction that is normal to an axis extending between the first attachment arm and the second attachment arm. In other words, the height of the shroud rail 113 varies along a circumferential direction. For example, the height of the shroud rail 113 may taper or converge in the circumferential direction, as shown in FIG. 5B with height 123G being greater than height 123F.

Figure 6:
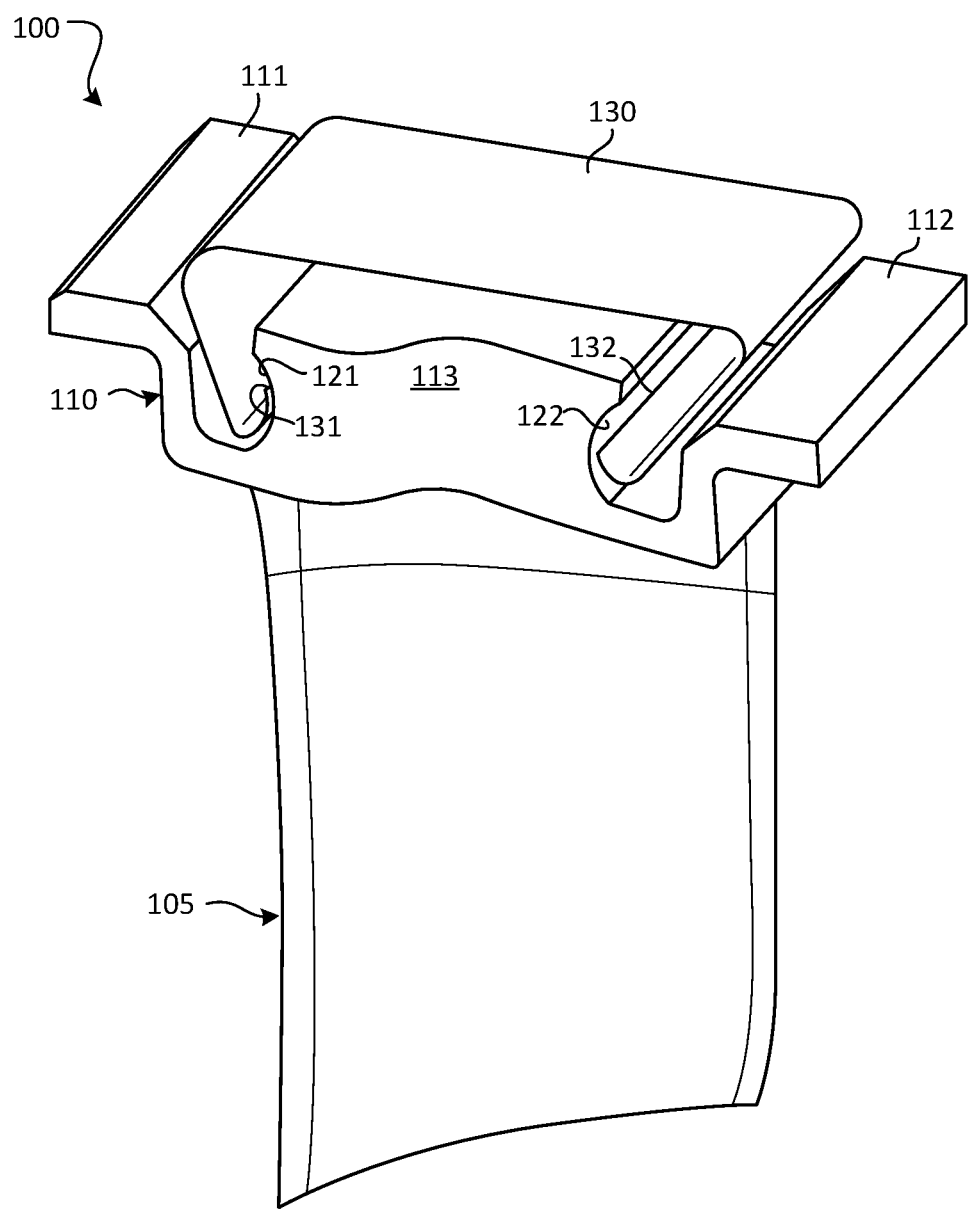
FIG. 6 is a perspective view of an airfoil assembly having a sealing panel coupled thereto, in accordance with various embodiments.

In various embodiments, as mentioned above, the airfoil assembly 100 may be a singlet stator vane. In various embodiments, and with reference to FIG. 6, the shroud rail 113 may include a forward wall 121 and an aft wall 122. A sealing panel 130 may extend over the shroud rail 113 and may be coupled at a first edge 131 to the forward wall 121 and at a second edge 132 to the aft wall 122. The sealing panel 130 may be a sheet metal material, or other similar material, and may be configured to inhibit radial fluid leakage. For example, in various embodiments, the sealing panel 130 extends over and is coupled to respective shroud rails of one or more circumferentially adjacent single stator vanes. That is, the sealing panel 130 may extend circumferentially across multiple airfoil assemblies to prevent radial fluid leakage between adjacent airfoil assemblies. In various embodiments, the forward wall 121 and the aft wall 122 of the shroud rail 113 are concave to facilitate coupling and retention of the sealing panel 130 to the shroud rail 113. In various embodiments, the walls 121, 122 of the shroud rail 113 may include other engagement features to help retain the sealing panel 130 in place.

Figure 7:
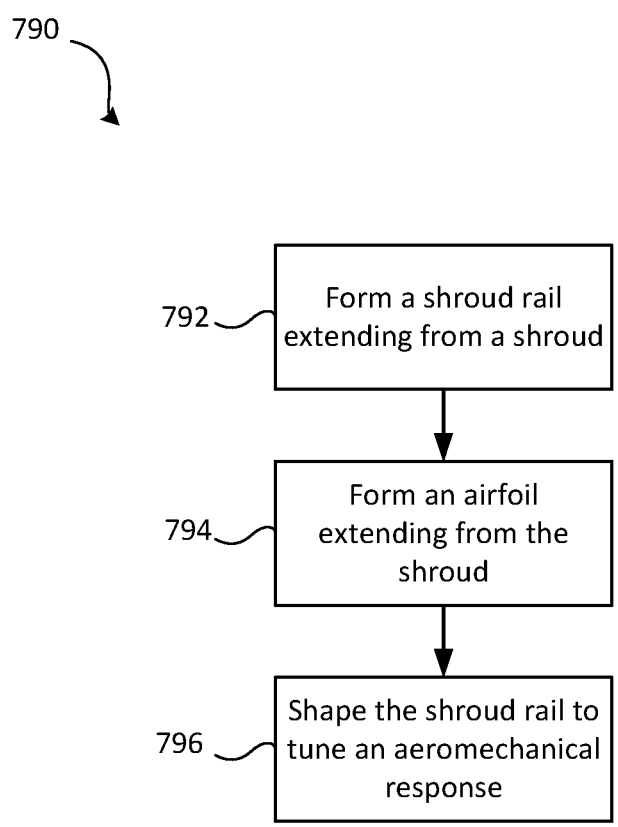
FIG. 7 is a schematic flow chart diagram of a method of manufacture, in accordance with various embodiments.

In various embodiments, and with reference to FIG. 7, a method 790 of manufacture is provided. The method 790 includes, according to various embodiments, forming the shroud rail 113 extending from the shroud 110 at step 792, forming the airfoil 105 extending from the shroud 110 at step 794, and shaping the shroud rail 113 to tune an aeromechanical response of the airfoil assembly at step 796. The forming and shaping steps 792, 794, 796 may be performed by casting, machining, additive manufacturing, etc. Shaping the shroud rail 113 at step 796 may include making a height (generally 123) of the shroud rail 113, as measured from the first surface 114 of the shroud 110, non-uniform. The method 790 may further include coupling the sealing panel 130 to the shroud rail 113.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. An airfoil assembly comprising:
a shroud comprising a first attachment arm, a second attachment arm, and a shroud rail extending from a first surface of the shroud, wherein:
a first channel is defined between the first attachment arm, the first surface, and the shroud rail; and a second channel is defined between the second attachment arm, the first surface, and the shroud rail; and
an airfoil extending from a second surface of the shroud opposite the first surface;
wherein a height of the shroud rail, as measured from the first surface of the shroud, tapers in a first direction across an entire width of the shroud rail in the first direction, wherein the first direction is from first attachment arm to the second attachment arm and is parallel to the first surface; and
wherein the shroud is a single, unitary body that is formed and shaped to have the first attachment arm, the second attachment arm, and the shroud rail.

2. The airfoil assembly of claim 1, wherein the height of the shroud rail varies in a second direction normal to an axis extending between the first attachment arm and the second attachment arm, wherein the second direction is parallel to the first surface.

3. The airfoil assembly of claim 2, wherein the height of shroud rail tapers in the second direction across an entire width of the shroud rail in the second direction.

4. The airfoil assembly of claim 1, wherein
the height of the shroud varies in a second direction normal to the first direction and parallel to the first surface.

5. The airfoil assembly of claim 1, wherein a distance between the first surface and the second surface is substantially uniform.

6. A manufacturing method comprising:
forming a shroud rail extending from a first surface of a shroud of an airfoil assembly, wherein the shroud rail is formed and shaped from a single material of the shroud such that the shroud rail is an integral extension of the shroud;
forming an airfoil extending from a second surface of the shroud opposite the first surface; and
determining both a desired aeromechanical response and a desired aerodynamic performance of the airfoil assembly;
shaping the shroud rail based on the desired aeromechanical response in order to impart a desired frequency mode to the airfoil assembly, wherein shaping the shroud rail comprises customizing a height of the shroud rail, as measured from the first surface, based on the desired aeromechanical response of the airfoil assembly; and
shaping the airfoil based on the desired aerodynamic performance in order to optimize aerodynamics of the airfoil assembly.

7. The method of claim 6, further comprising coupling a sealing panel to the shroud rail of the airfoil assembly, wherein the sealing panel extends over and is coupled to respective shroud rails of one or more circumferentially adjacent singlet stator vanes.

8. An airfoil assembly comprising:
a shroud comprising a first attachment arm, a second attachment arm, and a shroud rail extending from a first surface of the shroud, wherein:
a first channel is defined between the first attachment arm, the first surface, and the shroud rail; and
a second channel is defined between the second attachment arm, the first surface, and the shroud rail; and
an airfoil extending from a second surface of the shroud opposite the first surface;
wherein a height of the shroud rail, as measured from the first surface of the shroud, tapers in a second direction across an entire width of the shroud rail in the second direction, wherein the second direction is normal to an axis extending between the first attachment arm and the second attachment arm and is parallel to the first surface; and
wherein the shroud is a single, unitary body that is formed and shaped to have the first attachment arm, the second attachment arm, and the shroud rail.

9. The airfoil assembly of claim 8, wherein the height of the shroud rail varies in a first direction from the first attachment arm to the second attachment arm, wherein the first direction is parallel to the first surface.

10. The airfoil assembly of claim 9, wherein the height of shroud rail tapers in the first direction across an entire width of the shroud rail in the first direction.

11. The airfoil assembly of claim 8, wherein:
the height of the shroud rail varies in a first direction from the first attachment arm to the second attachment arm.

12. The airfoil assembly of claim 8, wherein a distance between the first surface and the second surface is substantially uniform.

* * * * *